(12) United States Patent
Cheng et al.

(10) Patent No.: US 8,440,038 B2
(45) Date of Patent: May 14, 2013

(54) METHOD FOR MAKING A LAMINATE

(75) Inventors: Hsien-Te Cheng, Tainan Hsien (TW); Hsien-Sung Cheng, Tainan Hsien (TW)

(73) Assignee: Xxentria Technology Materials Co., Ltd., Tainan Hsien (TW)

( * ) Notice: Subject to any disclaimer, the term of this patent is extended or adjusted under 35 U.S.C. 154(b) by 336 days.

(21) Appl. No.: 12/869,714

(22) Filed: Aug. 26, 2010

(65) Prior Publication Data

US 2011/0048623 A1 Mar. 3, 2011

Related U.S. Application Data

(63) Continuation-in-part of application No. 11/503,561, filed on Aug. 11, 2006, now abandoned.

(30) Foreign Application Priority Data

May 8, 2006 (TW) .............................. 95116229 A

(51) Int. Cl.
*B29C 53/04* (2006.01)
*B29C 47/02* (2006.01)
(52) U.S. Cl.
USPC . 156/201; 156/228; 156/244.22; 156/244.24; 156/244.27

(58) Field of Classification Search .................. None
See application file for complete search history.

(56) References Cited

U.S. PATENT DOCUMENTS

| | | | | |
|---|---|---|---|---|
| 3,290,195 | A | * | 12/1966 | Davis ............................ 156/139 |
| 3,684,610 | A | * | 8/1972 | Frielingsdorf et al. .. 156/244.19 |
| 3,841,132 | A | * | 10/1974 | Kuhn et al. ...................... 72/163 |
| 2008/0035267 | A1 | * | 2/2008 | Cheng et al. .................. 156/196 |

* cited by examiner

*Primary Examiner* — Barbara J Musser
(74) *Attorney, Agent, or Firm* — Ladas & Parry LLP

(57) ABSTRACT

A method for making a laminate includes: extruding a core layer, and advancing the same along a processing line; advancing upper and lower metal layers, and bending the upper metal layer to form a raised bent structure; laminating the upper and lower metal layers with the core layer by passing through a nip of a pair of laminating rollers, one of which has an embossing groove that is shaped to complement the raised bent structure and that permits the raised bent structure to pass therethrough; and embossing the core layer to protrude into the raised bent structure while the core layer and the upper and lower metal layers are passed through the nip. The upper metal layer is inclined with a tangent line that passes through the nip by an angle of less than 15 degrees when at a position immediately upstream of the nip.

3 Claims, 6 Drawing Sheets

METHOD FOR MAKING A LAMINATE

CROSS-REFERENCE TO RELATED APPLICATION

This application is a continuation-in-part (CIP) of U.S. patent application Ser. No. 11/503,561, filed on Aug. 11, 2006 now abandoned, the entire disclosure of which is incorporated herein by reference.

BACKGROUND OF THE INVENTION

1. Field of the Invention

This invention relates to a method for making a laminate, more particularly to a continuous method for making a laminate with a bent structure continuously.

2. Description of the Related Art

A laminate of a composite plate normally has a bent structure for enhancing the structural strength thereof. As shown in FIG. 1, a conventional laminate 1 with a bent structure includes upper and lower metal layers 111, 112, and a core layer 113 of a foam material sandwiched between the upper and lower metal layers 111, 112. The laminate 1 is produced by extruding the core layer 113, adhering the upper and lower metal layers 111, 112 onto the core layer 113 using an adhesive so as to form a composite strip, cutting the composite strip into a plurality of flat laminates 11, transferring the flat laminates 11 to a pressing machine, and pressing each of the flat laminates 11 into the laminates 1 with the bent structure. The bent structure normally includes a compressed segment 12 and a base 13. With the compressed segment 12, the laminate 1 thus formed has a rigid structure and can be stacked on a compressed segment 12' of another laminate 1' so as to obtain a firmer structure (see FIG. 2).

However, production of the aforesaid laminate 1 is not a continuous process. In particular, the flat laminates 11 thus formed have to be transferred to the pressing machine to form the laminate 1 with the bent structure, which is inefficient and which results in an increase in manufacturing costs. In addition, upon pressing, since the adhesive for adhering the upper and lower metal layers 111, 112 onto the core layer 113 have been cured, the strength of the adhesive is likely to be destroyed, thereby adversely affecting the adhesion property of the adhesive.

SUMMARY OF THE INVENTION

Therefore, the object of this invention is to provide a method that can continuously and efficiently make a laminate with a bent structure including upper and lower metal layers and a core layer.

According to this invention, a method for making a laminate includes: extruding a core layer, and advancing the same along a processing line; advancing upper and lower metal layers above and below the core layer, and bending the upper metal layer to form a raised bent structure while advancing the upper metal layer; laminating the upper and lower metal layers with the core layer by passing the upper and lower metal layers and the core layer through a nip of a pair of laminating rollers, one of which has an embossing groove that is shaped to complement the raised bent structure and that permits the raised bent structure to pass therethrough; and embossing the core layer to protrude into the raised bent structure while the core layer and the upper and lower metal layers are passed through the nip. The upper metal layer is inclined with a tangent line that passes through the nip by an angle of less than 15 degrees when the upper metal layer is at a position immediately upstream of the nip.

BRIEF DESCRIPTION OF THE DRAWINGS

Other features and advantages of the present invention will become apparent in the following detailed description of a preferred embodiment of this invention, with reference to the accompanying drawings, in which.

DETAILED DESCRIPTION OF THE PREFERRED EMBODIMENT

The entire disclosure of the parent application, i.e., U.S. patent application Ser. No. 11/503,561, is incorporated herein by reference.

Figure 1:
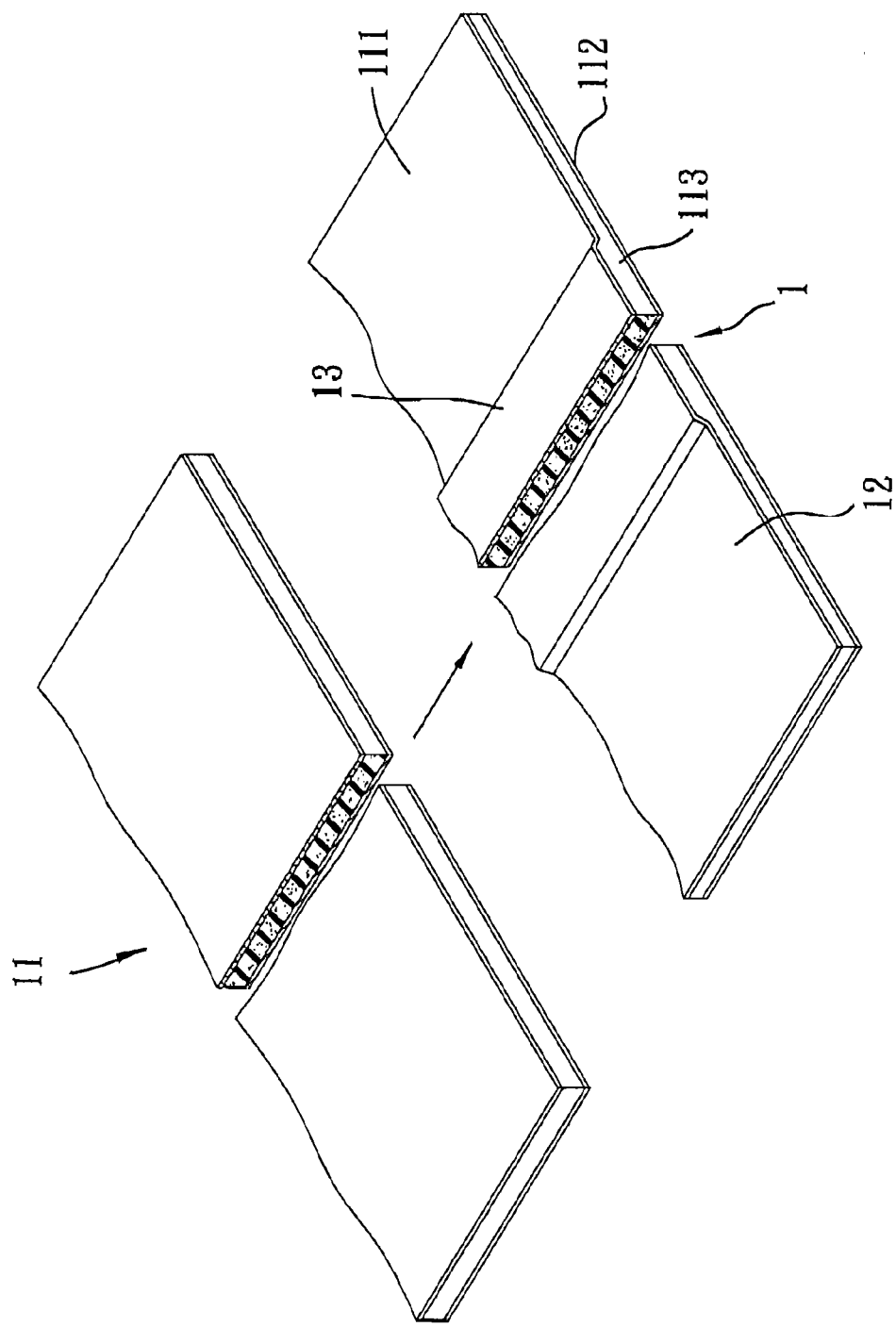
FIG. 1 is fragmentary perspective view illustrating a step of pressing a flat laminate to form a bent laminate in the prior art.
Figure 2:
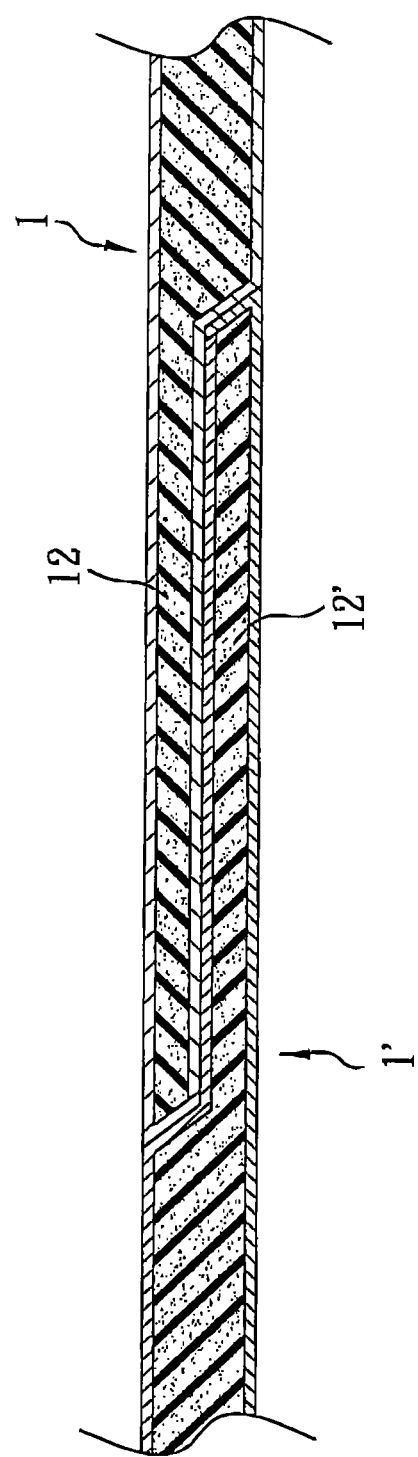
FIG. 2 is a fragmentary schematic cross-sectional view illustrating bonding of two bent laminates in the prior art.
Figure 3:
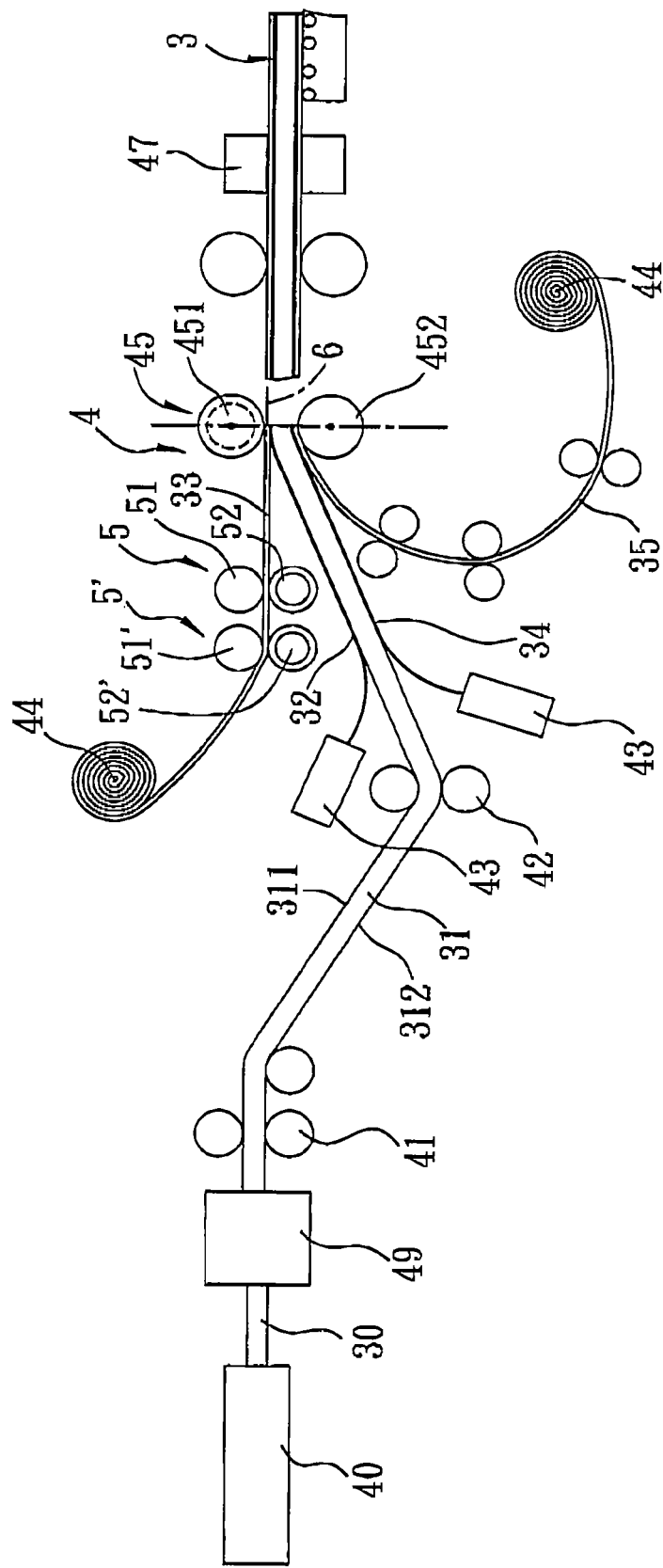
FIG. 3 is a schematic diagram to illustrate the preferred embodiment of a method for making a laminate according to this invention.
Figure 4:
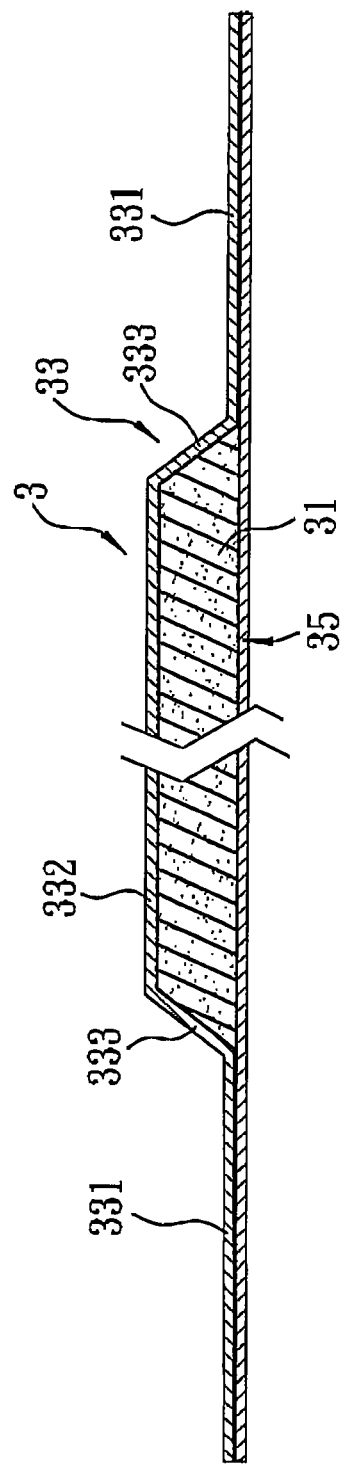
FIG. 4 is a fragmentary schematic cross-sectional view showing a laminate with a raised bent structure obtained according to the method of this invention.

FIG. 3 illustrates the preferred embodiment of a method for making a laminate 3 according to the present invention and a system 4 used to perform the method of this invention. As shown in FIGS. 3 and 4, the laminate 3 includes a core layer 31 having an upper side 311 and a lower side 312, an upper metal layer 33 bonded adhesively on the upper side 311 of the core layer 31 by an adhesive layer 32, and a lower metal layer 35 bonded adhesively on the lower side 312 of the core layer 31 by an adhesive layer 34. At least one of the upper and lower metal layers 33, 35 is pressed to form a bent structure. In this embodiment, the upper metal layer 33 is formed with a raised bent structure, and the lower metal layer 35 is in a flat sheet form. Specifically, as shown in FIG. 4, in this embodiment, the upper metal layer 33 includes the raised bent structure and two compressed segments 331 spaced apart from each other by the raised bent structure. The raised bent structure protrudes from the compressed segments 331 and includes a base portion 332 having two edges opposite to each other and two inclined portions 333 each of which is inclined from the respective one of the edges of the base portion 332 to the respective one of the compressed segments 331.

As shown in FIG. 3, the system 4 for performing the method of this invention includes: an extruder 40 for extruding the core layer 31; an adhesive-applying unit 43 disposed downstream of the extruder 40 for applying the adhesives 32, 34 onto the upper and lower sides 311, 312 of the extruded core layer 31; and a roller unit disposed downstream of the extruder 40 for conveying the core layer 31 and the upper and lower metal layers 33, 35 along a processing line and for pressing the core layer 31 and the upper and lower metal layers 33, 35 into the laminate 3.

The roller unit includes a pair of laminating rollers 45 for laminating the core layer 31 and the upper and lower metal layers 33, 35, a set of bending rollers for bending the upper metal layer 33, and a set of deflector rollers 42 and a set of conveying rollers for conveying the core layer 31 and the upper and lower metal layers 33, 35. The roller unit further includes a pair of cooling rollers 41 for cooling the core layer 31. The laminating rollers 45 are disposed downstream of the adhesive-applying unit 43 and cooperatively define a nip that is disposed on the processing line.

The method for continuously forming the laminate 3 according to this invention includes: extruding the core layer 31, and advancing the same along the processing line; advancing the upper and lower metal layers 33, 35 and bending the upper metal layer 33 to form a raised bent structure while advancing the upper metal layer 33; laminating the upper and lower metal layers 33, 35 with the core layer 31; embossing the core layer 31 to protrude into the raised bent structure while the core layer 31 and the upper and lower metal layers 33, 35 are passed through the nip.

Details of each of the steps of the method according to this invention are illustrated below.

In the step of extruding and advancing the core layer 31, a foamable material containing a foaming agent and a foaming aid is extruded using the extruder 40 so as to form an extrudate 30, followed by passing the extrudate 30 through an extrusion die 49 to form the core layer 31 in a sheet form. The foamable material for the core layer 31 is selected from the group consisting of polyethylene, polypropylene, ethylene-vinyl acetate copolymer, and combinations thereof. The foaming agent is selected from the group consisting of azodicarbonamide and N,N'-dinitrosopentamethylene tetraamine. The foaming aid is selected from the group consisting of zinc oxide and cadmium stearate.

The extruded core layer 31 subsequently advances through the pair of cooling rollers 41 from the extrusion die 49 along a line substantially parallel to a tangent line 6 that passes through the nip of the pair of laminating rollers 45, and further advances from the cooling rollers 41 to the nip along an advancing path. The advancing path gradually turns away from the tangent line 6 and thereafter turns toward the tangent line 6 after passing through the set of deflection rollers 42 disposed downstream of the cooling rollers 41 and offset from the tangent line 6.

In the advancing path that is toward the tangent line 6, the core layer 31 is applied with the adhesive layers 32, 34 on the upper and lower sides 311, 312 thereof using the adhesive-applying unit 43. A material for the adhesive layers 32, 34 is not limited, i.e., any material capable of adhering the upper and lower metal layers 33, 35 onto the core layer 31 may be used. For example, the adhesive layers 32, 34 can be formed by attaching an adhesive film on each of the upper and lower sides 311, 312 of the core layer 31 and melting the adhesive film using a pair of heating rollers.

In the step of advancing the upper and lower metal layers 33, 35 and bending the upper metal layer 33, the upper and lower metal layers 33, 35 are supplied from a metal layer-supplying unit 44 incorporated in the system 4 and are conveyed along the processing line toward the laminating rollers 45. Each of the upper and lower metal layers 33, 35 is made from a metal having good rigidity and strength, and, for the sake of good appearance, each of the metal layers 33, 35 can be coated with a color baked layer. The material for the metal layers 33, 35 can be selected from the group consisting of aluminum alloy sheet, zinc-plated steel sheet, aluminum zinc-plated steel sheet, aluminum zinc magnesium-plated steel sheet, titanium alloy sheet, copper alloy sheet, stainless steel sheet, zinc alloy sheet, and paint coated steel sheet.

Before advancing to the laminating rollers 45, the upper metal layer 33 is pressed using the set of the bending rollers so as to form the raised bent structure. In this embodiment, the set of the bending rollers includes first and second pairs of bending rollers 5, 5', each of which includes an upper bending roller 51, 51' and a lower bending roller 52, 52', and is formed with a shape-forming structure.

Figure 5:
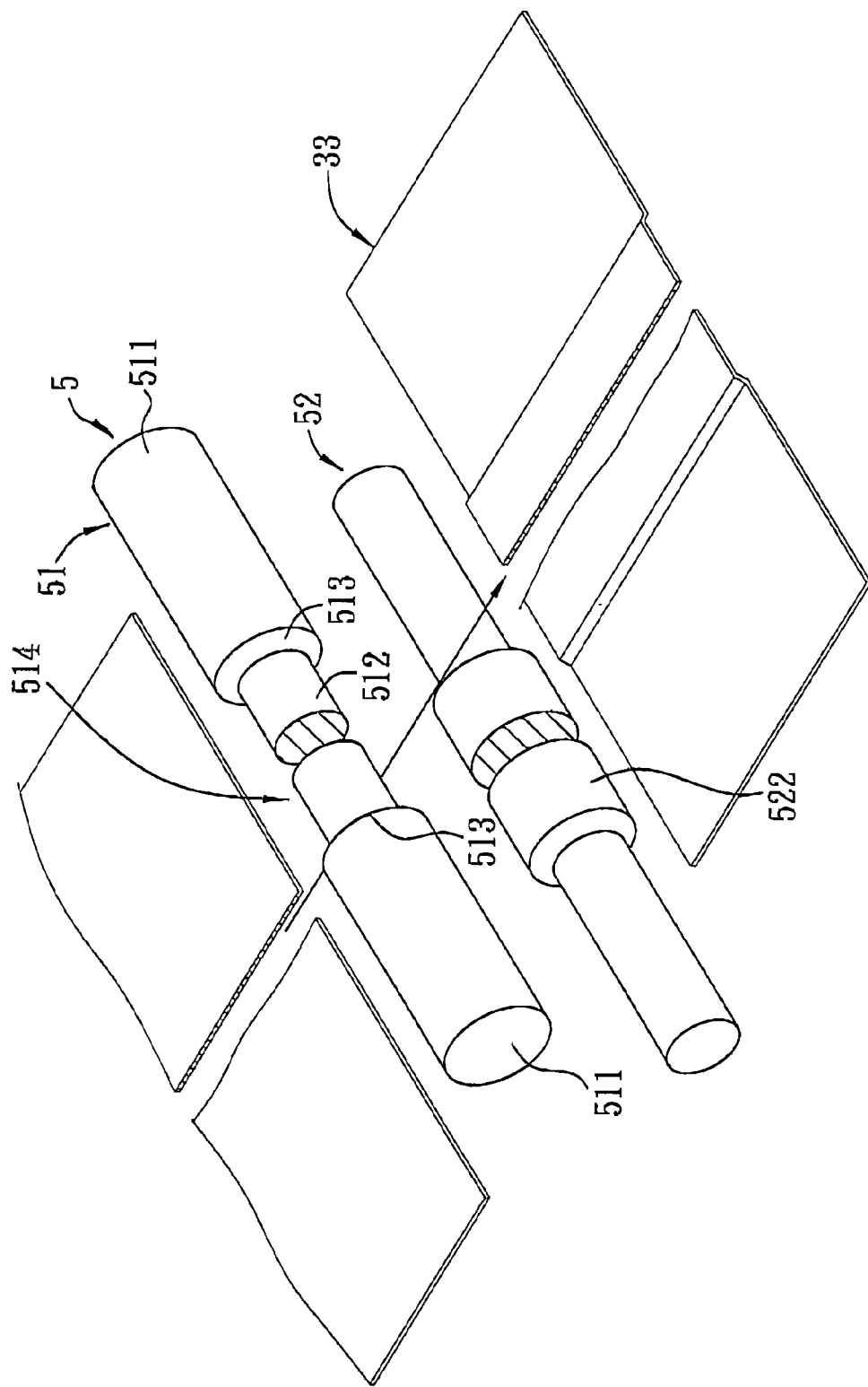
FIG. 5 is a fragmentary schematic perspective view showing a metal layer with a raised bent structure obtained by passing a flat metal layer through a pair of bending rollers.

FIG. 5 shows the first pair of bending rollers 5 formed with the shape-forming structure. The shape-forming structure is defined by forming an annular groove 514 and a protrusion 522 on the upper and lower bending rollers 51, 52 of the first pair of bending rollers 5, respectively. The annular groove 514 has a depth and is shaped to complement the raised bent structure. The protrusion 522 has a height equal to the depth of the annular groove 514. Specifically, the upper bending roller 51 is thus divided by the annular groove 514 into two first segments 511 with a first diameter, two inclined segments 513, and a second segment 512 with a second diameter smaller than the first diameter of the first segments 511. The first segments 511 are spaced apart from each other by the second segment 512 and are respectively connected to two opposite ends of the second segment 512 by the inclined segments 513. The lower bending roller 52 is shaped to complement the upper bending roller 51.

The second pair of bending rollers 5' are disposed upstream of the first pair of bending roller 5 and the shape-forming structure thereof is similar to that of the first pair of bending rollers 5, except that the depth of the annular groove and the height of the protrusion formed on the second pair of bending rollers 5' are smaller than those of the first pair of bending rollers 5. Therefore, the upper metal layer 33 is bent progressively.

Figure 6:
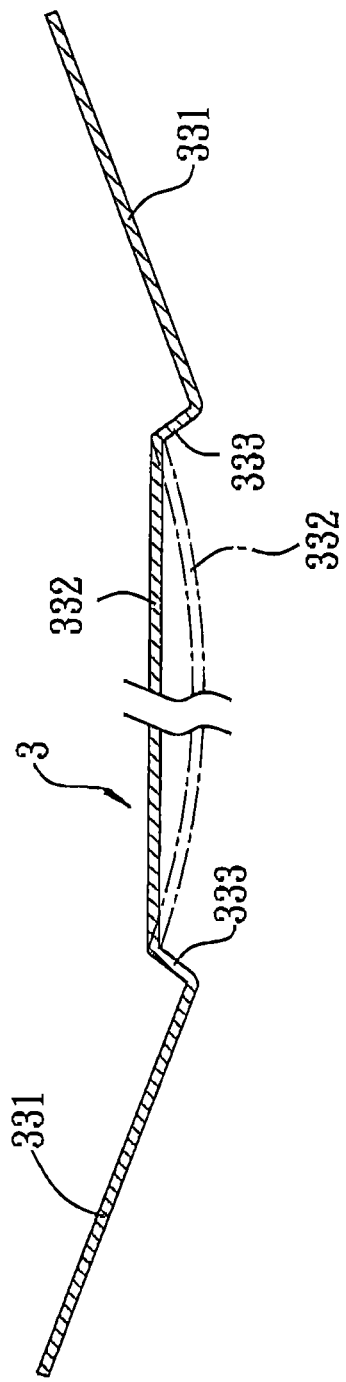
FIG. 6 is a schematic cross-sectional view illustrating the metal layer formed with the raised bent structure at a deformed state.

It should be noted that the bending rollers 51, 51', 52, 52' are disposed along the processing line such that the upper metal layer 33 is inclined with the tangent line 6 by an angle of less than 15 degrees when the upper metal layer 33 is at a position immediately upstream of the nip. Based on test conducted by the applicants, when the angle of the upper metal layer 33 is equal to or larger than 15 degrees, the upper metal layer 33 formed with the raised bent structure is likely to be deformed, e.g., as shown in FIG. 6, the two compressed segments 331 are warped or the base portion 332 is indented, thereby adversely influencing the quality of the laminate 3. Preferably, the angle of the upper metal layer 33 is less than 10 degrees. In the embodiment of this invention, the angle of the upper metal layer 33 is 0 degree (see FIG. 3).

The core layer 31, the upper metal layer 33 formed with the raised bent structure, and the lower metal layer 35 are laminated by passing the same through the nip of the pair of laminating rollers 45. The pair of laminating rollers 45 include an upper laminating roller 451 and a lower laminating roller 452. The upper laminating roller 451 has a shape and a size corresponding to those of the upper bending roller 51. To be specific, the upper laminating roller 451 is formed with an embossing groove that corresponds in shape to the annular groove 514 of the upper bending roller 51, i.e. is shaped to complement the raised bent structure of the upper metal layer 33, and that permits the raised bent structure to pass therethrough. The lower laminating roller 452 is cylindrical in shape. When the core layer 31, the upper metal layer 33, and the lower metal layer 35 are laminated, the core layer 31 is also embossed to protrude into the raised bent structure of the upper metal layer 33 so as to form the bent laminate 3.

For the sake of easy transportation, the bent laminate 3 is thus transferred to a cutting unit 47 which is incorporated in the system 4 and is disposed downstream of the pair of laminating rollers 45 for cutting the bent laminate 3 into a plurality of pieces with a desired length.

By varying the shape-forming structures of the bending rollers 51, 51', 52, 52' and the laminating roller 451, 452, the method according to this invention can be used to make various laminates having different bent structures.

Moreover, by controlling the angle of the upper metal layer 33 with respect to the tangent line 6 that passes through the nip to be less than 15 degrees when the upper metal layer 33 is at a position immediately upstream of the nip, the deformation of the upper metal layer 33 formed with the bent structure can be prevented.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A method for making a laminate, comprising:
    extruding a core layer, and advancing the same along a processing line;
    advancing upper and lower metal layers above and below the core layer, and bending the upper metal layer to form a raised bent structure while advancing the upper metal layer;
    laminating the upper and lower metal layers with the core layer by passing the upper and lower metal layers and the core layer through a nip of a pair of laminating rollers, one of which has an embossing groove that is shaped to complement the raised bent structure and that permits the raised bent structure to pass therethrough; and
    embossing the core layer to protrude into the raised bent structure while the core layer and the upper and lower metal layers are passed through the nip;
    wherein the upper metal layer is angled relative to a tangent line passing through the nip by an angle of less than 15 degrees when the upper metal layer is at a position immediately upstream of the nip; and
    the advancing of the core layer includes the steps of:
        advancing the core layer through a pair of cooling rollers from an extruder along a line substantially parallel to the tangent line; and
        advancing the core layer from the cooling rollers to the nip along an advancing path that turns away from the tangent line and that thereafter turns toward the tangent line.

2. The method of claim 1, wherein the angle of the upper metal layer is less than 10 degrees.

3. The method of claim 1, wherein the core layer is advanced from the cooling toiler to the nip by being passed through a set of deflector rollers that are disposed downstream of the cooling rollers and that are offset from the tangent line.

\* \* \* \* \*